UNITED STATES PATENT OFFICE.

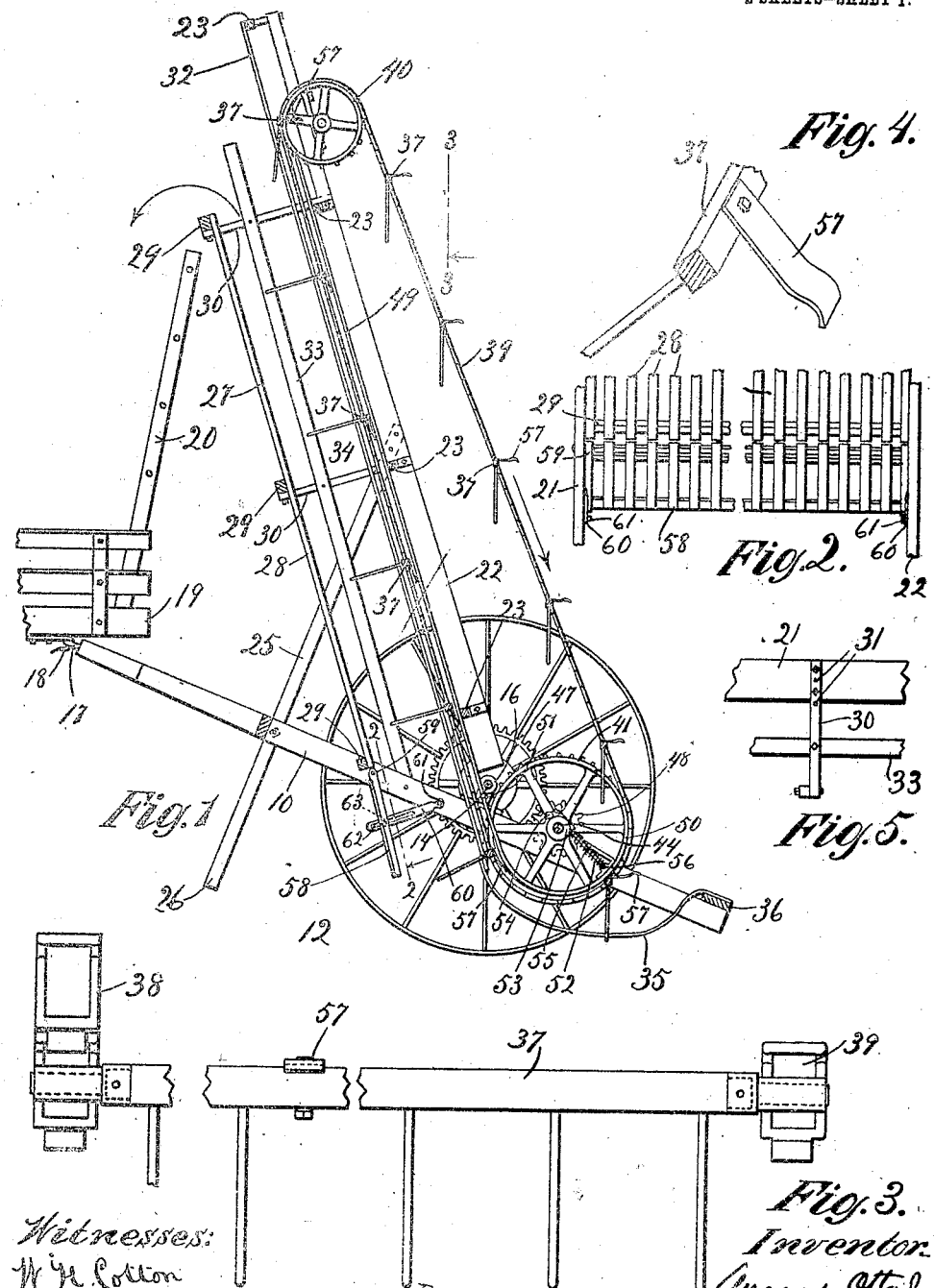

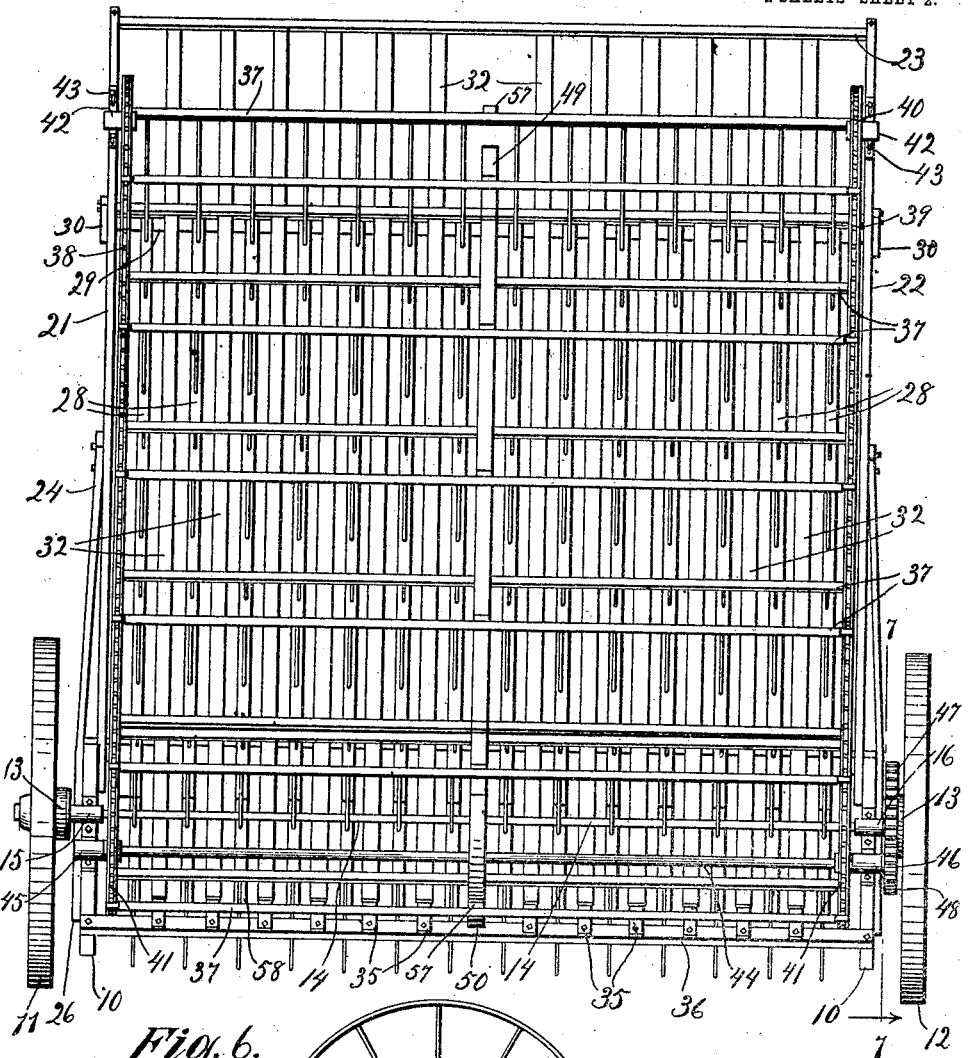

AUGUST OTTO, JR., OF SANDWICH, ILLINOIS.

HAY-LOADER.

No. 888,527.     Specification of Letters Patent.     Patented May 26, 1908.

Application filed March 9, 1907. Serial No. 361,454.

*To all whom it may concern:*

Be it known that I, AUGUST OTTO, Jr., a citizen of the United States, and resident of Sandwich, county of Dekalb, and State of Illinois, have invented certain new and useful Improvements in Hay-Loaders, of which the following is a specification, and which are illustrated in the accompanying drawings, forming a part thereof.

The invention relates to devices for gathering hay from the field, and for elevating it and discharging it upon a wagon.

The object of the invention is to simplify and improve the construction and operation of devices of this kind, whereby they are rendered less expensive to build, and are made to consume less power in operation without sacrificing their durability or efficiency.

The invention contemplates a wheeled frame adapted to be attached to the rear of a wagon to be loaded and having an inclined chute or deck leading from a point adjacent the ground at the rear of the wagon to a point above the wagon bed, and a plurality of rakes movable over the ground at the foot of the chute and into and through the chute.

In the accompanying drawings Figure 1 is a central vertical section of a hay loader embodying the invention, and shows in side elevation a detail of a wagon to be loaded thereby; Fig. 2 is a sectional view taken on the line 2—2 of Fig. 1; Fig. 3 is a detail elevation of the loader viewed from the line 3—3 of Fig. 1; Figs. 4 and 5 illustrate details of construction of the loader; Fig. 6 is a rear elevation of the loader; and Fig. 7 is a sectional detail taken on the line 7—7 of Fig. 6.

The frame 10 of the form of loader illustrated in the drawings for the purpose of exemplifying the invention, is mounted upon carrying wheels 11 and 12. Each of these carrying wheels is connected by a ratchet hub mechanism 13, of usual construction and shown in detail in Fig. 7, to a rotating axle 14 extending from side to side of the frame 10, and journaled in boxes 15, 16, carried by the frame.

The device is preferably drawn by the wagon to be loaded, and to that end an eye 17 is provided at the forward end of the frame 10, and is adapted to be engaged by a hook 18, permanently secured at the rear of the bed of a wagon 19. A frame 20, which customarily takes the form of a ladder, is mounted at the rear of the wagon 19 for supporting its load, and in practice the wagon may be loaded with a device provided by the invention without removing this ladder.

Upright members 21, 22, rise from the frame 10, one adjacent each side, and when the device is in loading position these members are preferably but slightly inclined from the vertical. Cross members 23 connect the uprights 21, 22, at intervals, and braces 24, 25, are secured to the uprights intermediate their ends and to the frame 10, and each of the braces is continued below the frame, as indicated at 26, to provide a supporting leg for the device when it is detached from the wagon 19.

An inclined deck 27, preferably comprising a plurality of longitudinal slats 28 united at intervals by cross members 29, is supported by the upright members 21, 22, and leads from a point adjacent the ground between the carrying wheels 11 and 12 to the top of the ladder 20 carried by the wagon, when the device is in loading position. As shown the deck 27 is secured to the upright members 21, 22, by bars 30, each of which is provided with a plurality of bolt-receiving apertures 31, most clearly shown in Fig. 5. Slats 32 extend longitudinally over the deck 27, and slats 33 are provided at each side of the deck to form an inclosed trough or chute 34, leading from the ground to a point above the wagon-bed to be loaded, the deck 27 being the floor of the chute.

Each of the slats 32 is of greater length than the deck 27, and is secured at its top to a cross member 23 uniting the uprights 21, 22, at a point considerably above the top of the deck 27. At the foot of the chute 34 each of the slats 32 is secured to the forward end of a curved strap 35, which extends horizontally over the ground to a cross-bar 36 at the rear of the frame 10.

A plurality of rake-bars 37 are provided for gathering hay from the ground between the carrying wheels 11 and 12, and carrying it upwardly through the chute 34. As shown, the rake-bars 37 are substantially equal in length to the width of the machine, and are gudgeoned at each end to the links of a sprocket chain 38, 39, each of which turns over sprockets 40 and 41 adjacent the upper and lower ends, respectively, of the chute 34. Each of the sprockets 40 turns in a journal bearing 42 adjustably secured by bolts 43 to one of the uprights 21, 22, and the sprockets 41 are mounted upon a shaft 44, extending the entire width of the machine, and journaled at 45, 46, in the frame 10 at the rear of the mouth of the chute 34. The shaft 44 is driven by gears 47, 48, from the rotating axle 14, and the sprockets 40 and 41 are so disposed that the rake bars 37, carried by the sprocket chains 38, 39, are drawn over the ground adjacent the mouth of the chute 34 and outwardly over the slats 32, the teeth of the rake-bars extending between the slats into the chute.

Provision is made for preventing the rotation of the rake bars 37 in their bearings on the sprocket chains 38, 39, as they are drawn over the ground and upwardly through the chute. To this end a guide-bar 49, carried by the cross-members 23 uniting the upright frame members 21, 22, extends longitudinally over the slats 32, preferably about midway of the width of the machine. At its lower end this bar is continued over the horizontally-disposed straps 35 which form a continuation of the slats 32, by a curved guide or cam member 50, which is hinged to the foot of the guide 49 at 51, its free end being yieldingly supported by a spring 52, reacting upon an apertured bearing-block 53, which rides on the shaft 44. The tension of the spring 52 may be adjusted by a winged nut 54 bearing upon the block 53 and having a threaded engagement with a rod 55, about which the spring is coiled, and which is pivotally united to the cam member 50 at 56. Each of the rake bars 37 is provided with a shoe 57 which extends backwardly at an angle from the rake bar and is adapted to ride beneath the cam member 50 and the guide 49 to support the rake bar in operative position.

In use the device will be drawn over the field at the rear of a wagon to be loaded, power being applied to the driving shaft 44 from the carrying wheels 11 and 12 to cause the sprocket chains 38, 39, to travel in the direction indicated by the arrow in Fig. 1. As each of the rake-bars 37, carried by the sprocket chains 38, 39, begins to move forwardly over the ground at the limit of its downward travel, the teeth of the rake bar projecting between the straps 35, the cam shoe 57 carried by the rake-bar comes into engagement with the cam-member 50 to maintain the rake-bar in such a position that its teeth are substantially perpendicular to the ground. As the machine advances over the ground, any material coming in contact with the teeth of its rake-bars is carried forwardly and upwardly through the chute 34, the cam shoe 57 of each of the rake-bars riding beyond the end of the guide-member 49 when the top of the chute is reached, and thus permitting the rake-bar to swing downwardly and its teeth to be withdrawn from the material which they carry as the sprocket chains turn over the sprocket wheels 40 at the top of the machine.

The deck 27 or floor of the chute 34, with the slats 33 forming the sides of the chute, may be moved toward or away from the slats 32 forming the cover of the chute by adjusting the length of the bars 30, as shown in Fig. 5. The capacity of the chute may thus be adapted to the crop. By reason of the slats 32 and 33 being extended beyond the upper end of the deck 27, material which is accumulated at the top of the chute will be pushed forwardly over the upper end of the deck 27 into the wagon to be loaded as the rake-bars 37 advance through the chute. The slats 32 serve to strip the material from the teeth of the rake-bars as they turn over the sprockets 40 at the top of the machine, and there is therefore no tendency for material to be carried down after it has once been delivered to the top of the machine.

If desired the mouth of the chute 34 may be adjusted in width without changing the depth of the chute throughout its entire length. To this end the deck 27 is made sectional, as most clearly shown in Fig. 2, the lower end 58 of the deck being hinged at 59. The hinged member 58 may be secured in any adjusted position by a strap 60, pivotally secured to one of the side members of the frame 10 at 61, and slotted at 62 to receive a clamping bolt 63, carried by the member 58. The teeth of the rake-bars 37 may be made to engage the stubble with greater or less force by adjusting the tension of the spring 52, which bears upon the cam member 50.

I claim as my invention—

1. In a hay loader, in combination, an inclined wheel-supported frame, a pair of parallel sprocket chains movable longitudinally of the frame, a rake-head having rigid teeth and being journaled in the two chains, a guide-bar for holding the rake-head against angular movement during its upward travel and being yielding at its lower end, such guide terminating at the upper end of the frame, the head being free to swing upon disengagement from the guide bar.

2. In a hay loader, in combination; a wheeled frame comprising an inclined deck, a sprocket wheel turning in a plane perpendicular to the deck journaled in the frame in front of the deck adjacent each end of the deck, a chain turning over the sprockets, a rake-bar rotatably mounted on the chain, a guide-way extending longitudinally over the deck and rearwardly at the base of the deck, the horizontal part of the guide-way being yielding, and a cam shoe carried by the rake-bar and extending backwardly therefrom for engaging the guide.

3. In a hay loader, in combination, an inclined deck, endless chains running over the deck, rotatable rake bars carried by the chains, a substantially horizontal guide projecting from the lower end of the deck and engaging the rake-bars to prevent their rotation, such guide being hinged at its inner end, and a spring bearing downwardly on the guide.

4. In a hay loader, in combination, an inclined deck, slats supported over the deck to form a chute and extending beyond the higher end of the deck, gathering means delivering to the foot of the chute and movable upwardly through the chute, and means for adjusting the depth of the chute throughout its entire length.

5. In a hay loader, in combination, an inclined deck, slats supported longitudinally over the deck to form a chute, a rake bar movable over the slats, the teeth of the rake bar projecting between the slats into the chute, and means for uniformly adjusting the depth of the chute throughout its length.

6. In a hay loader, in combination, a deck having hay-carrying slats, rakes, means for carrying the rakes over the deck and in a path parallel therewith, and means for adjusting the slats to vary the distance between them and the plane of movement of the rakes.

7. In a hay loader, in combination, an inclined deck, an endless carrier traveling over the deck, rake-bars swingingly mounted on the carrier, a guide parallel with the deck for holding the rake-bars in operative position, such guide having a backwardly-directed yielding extension at its lower end.

AUGUST OTTO, Jr.

Witnesses:
S. P. SEDGWICK,
J. E. WHITE.